March 22, 1966 D. P. COOPER, JR., ETAL 3,242,260

COLOR TELEVISION

Filed Nov. 2, 1961 2 Sheets-Sheet 1

INVENTORS:
Dexter P. Cooper, Jr.
and
BY David S. Grey
Brown and Mikulka
ATTORNEYS INVENTORS:
Dexter P. Cooper, Jr.
and
David S. Grey
BY Brown and Mikulka
ATTORNEYS United States Patent Office 3,242,260
Patented Mar. 22, 1966

3,242,260

COLOR TELEVISION

Dexter P. Cooper, Jr., and David S. Grey, Lexington, Mass., assignors to Polaroid Corporation, Cambridge, Mass., a corporation of Delaware Filed Nov. 2, 1961, Ser. No. 149,655
11 Claims. (Cl. 178—5.4)

The present invention relates to improvements in electronic production of color displays and, in one particular aspect, to novel and improved television apparatus involving two color codes which nevertheless reproduces full-color images and which is of uncomplicated construction lending itself to low-cost manufacture and to uses compatible with conventional three-color or black-and-white television transmissions.

In conformity with classical theories relating to color and its perception, the reproduction of scenes in color by electronic means has been approached routinely by resolving the subject in terms of three primary-color components and by recombining all of these after transmission to a remote site. Translation of the subject into appropriate form for transmission and reception as electrical signals is commonly made possible through aid of cameras requiring a minimum of three image orthicon tubes and associated filters which appropriately pass the viewed primary-color content of them. Then, as is further well known, the needed unique chrominance, luminance and synchronizing information for primary-color television systems has been crowded into relatively narrow bandwidths for purposes of electromagnetic radiation within limited broadcast spectra. In turn, at each receiver installation, the transmitted information is resolved into electrical signals for actuation of a picture tube which is conventionally of a particularly complex construction involving three electron guns individually controlled to develop electron beams properly scanning a phosphor dot screen having a prescribed tripe-dot pattern of three phosphors each emissive of light of a different primary color. It offers obvious advantage, therefore, to televise in multiple colors through translations involving less than three color codes, particularly where the perceived images not only faithfully convey full natural color but are also subject to improved control, and where picture tube constructions are vastly simplified. According to certain aspects of the present teachings, such advantages may be realized in part through exploitation of the known phenomenon that colors perceived in the field of an image are dependent upon the interplay of its longer and shorter wavelengths, without limitation to those specific wavelengths of the Newtonian spectrum with which colors are classically identified, and, in part, through a related exploitation of certain variations in the emissivity characteristics of phosphors whereby simple control of kinetic energy of electrons reaching two adjacent scanned phosphors occasions visible emissions of one or both phosphors to stimulate perceptions of more than two colors.

It is one of the objects of this invention, therefore, to provide improvements in and simplification of multi-color electronic displays of the type involving visible emissions having relatively longer and shorter wavelengths which are not limited to specific wavelengths for the primary colors.

A further object is to provide novel and improved displays in multiple colors involving visible electronically-stimulated emissions of one or both of two reltively longer and shorter wavelengths or bands of wavelengths which are independent of the specific wavelengths for the primary colors.

Another object of this invention is to provide natural-color television apparatus of uncomplicated form lending itself to economical manufacture and to compatibility with three-color and black-and-white transmissions, and in which multi-color reproduction may be developed by controlled excitation selectably of simultaneously more than one and alternatively less than all of a plurality of materials emitting light of different wavelengths.

A yet further object is to provide novel and improved natural-color television picture tubes of simplifier low-cost construction in which but two arrays of phosphor are required at the viewing screen and in which one or both of these are stimulated at various times at discrete positions to reproduce images in full color.

By way of a summary account of practice of this invention in one of its aspects, the scenes viewed by camera equipment of a television transmitting station are translated into two separate images through different optical filters, such as red and green filters, and each of these images in turn excites the sensitive screen of a different image orthicon tube to produce independent characterizing electrical output signals. At a receiving site, the two characterizing output signals are duplicated for purposes of controlling the intensities of an electron beam which scans a unique screen target assembly disposed near the face of a picture tube, and, in accordance with one technique for scanning, each of the color-coded signals derived from the two camera tubes is applied in control of the intensity of an electron beam such that the scanning of discrete portions of a special form of target by the beam is at different times modulated in conformity with the scene as viewed through a different filter by a different one of the camera pickup tubes. One suitable construction of the cooperating picture tube target or faceplate involves two thin superposed phosphor screen coatings and a metallic retardation grid atop the screen coating nearer the electron gun and formed by hundreds of thin-spaced parallel wirelike metallic strips. The innermore phosphor coating, nearer the gun and retardation grid, comprises a phosphor which emits reddish light when stimulated by impinging electrons having at least a predetermined minimum kinetic energy, while the adjacent thin coating nearer the transparent tube face is transparent and comprises a phosphor which emits a non-red and preferably green-blue light only when stimulated by electrons having at least the same kinetic energy. Characteristically, the inner phosphor coating retards and reduces the kinetic energy of the electrons in the beam passing through it to the adjacent phosphor coating. Accelerating potential for the electron beam of the picture tube is set to develop kinetic energy of the electrons impinging upon the phosphors which is sufficiently above the pretermined minimum to excite both coatings, which is the case when the electrons from the beam are scanned between the strips of the retardation grid. The grid strips are of such thickness that they pass electrons projected thereon from the beam when it is deflected to impinge upon these strips, but in doing so nevertheless absorb some of their kinetic energy and thereby reduce the resultant energy to a level sufficient to stimulate emission only from the inner coating, the further retardation of kinetic energy by the inner coating then leaving kinetic energy insufficient to stimulate emission from the outer coating. Scanning by the electron-beam, at certain moments along and at the other moments between the grid strips, thereby serves to promote two different conditions of light emission which, appropriately modulated in intensities by a conventional type of gun-grid control, cause perception of reproduced images in full color.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

Figure 3:
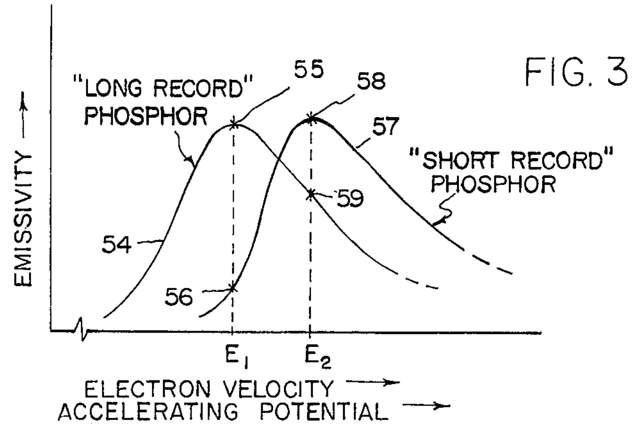
Figures 4, 5, 6:
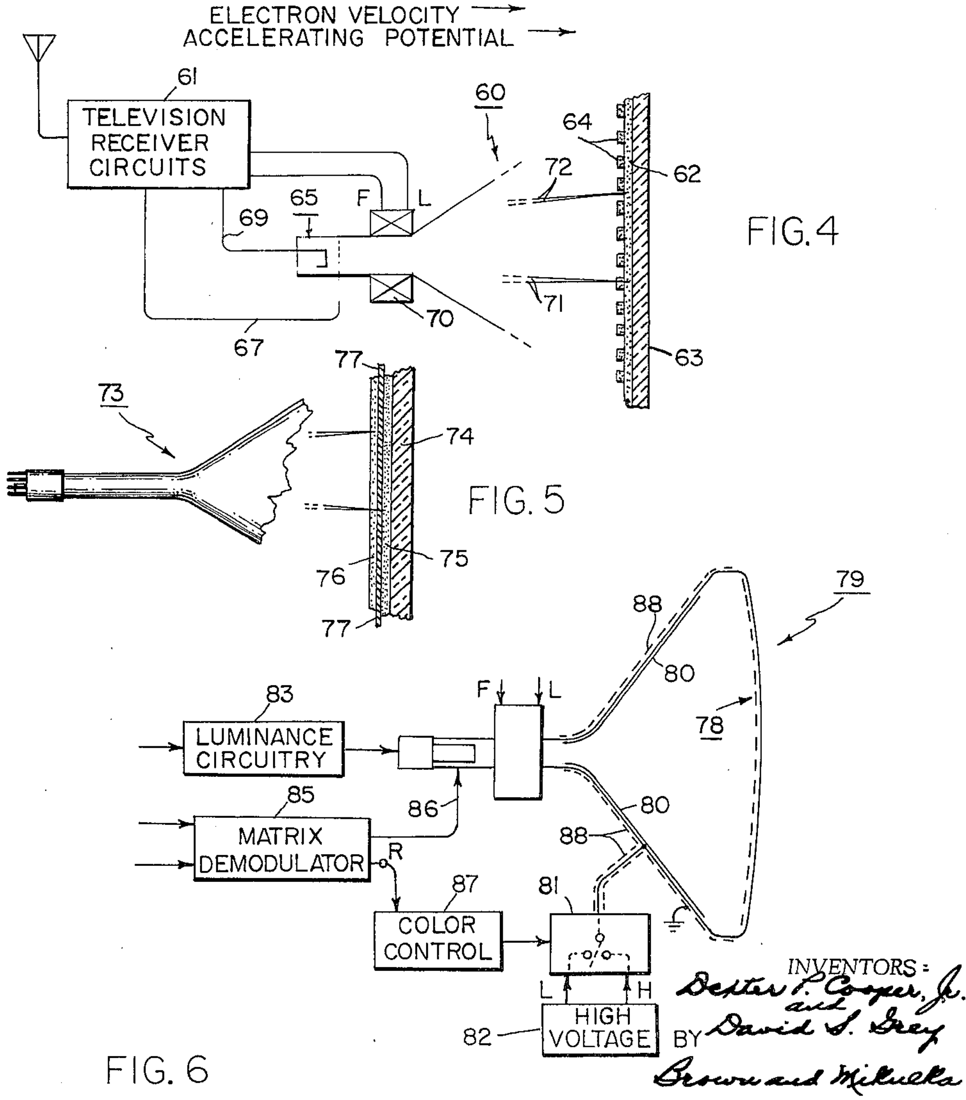

FIG. 3 provides characteristic curves of phosphor emissivities related to the velocities of impinging electrons and, hence, to accelerating potentials in a picture tube;

FIG. 4 depicts another television receiver apparatus based upon the present teachings and including a schematic illustration of the neck assembly of a picture tube together with an enlarged cross-sectioned fragment of the faceplate;

FIG. 5 illustrates a color television picture tube of alternative construction, by way of a pictorial fragment of the envelope and a cross-sectioned enlarged fragment of the face and screen array; and FIG. 6 is a partly schematic and partly block-diagrammed representation of part of a television receiver wherein electron accelerating potentials are modulated to stimulate emissions developing colored images.

Figure 1:
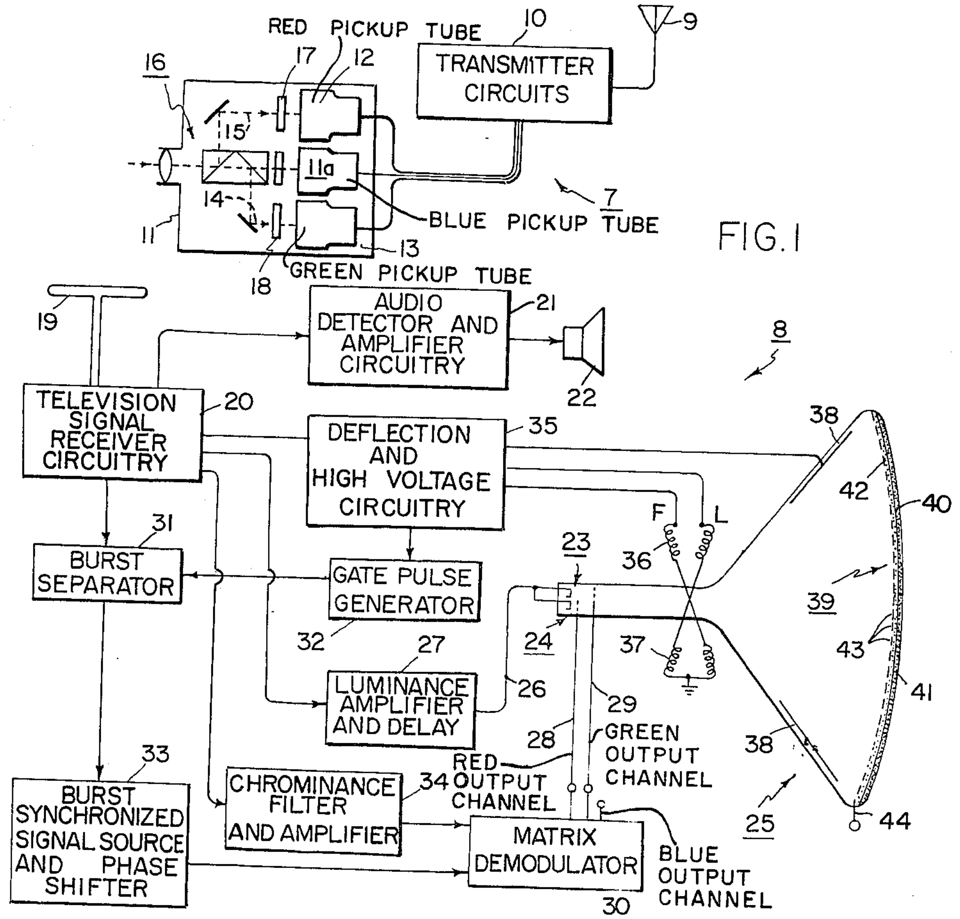
FIGURE 1 represents a full-color television system embodying certain of the present teachings, in part in block-diagram and in part in schematic forms.

The arrangement portrayed in FIGURE 1 includes transmitter and receiver apparatus, 7 and 8 respectively, which are in communication by way of electromagnetic radiations within a prescribed VHF channel. Transmitting antenna 9 is excited by transmitter circuits 10 of conventional type which generate an output modulated to contain the usual five requisite components (sound, video, deflection, chrominance and color burst) for the emitted color signal, the luminance and chrominance aspects of the televised scene being characterized in a camera assembly 11 which may include the usual three pickup tubes, only two of which are needed for practice of certain of the present teachings. Since this invention is not concerned with the transmission of television signals, and is concerned with the taking of the television picture only to the extent that camera 11 includes at least the illustrated pair of pickup tubes 12 and 13 (as well as the usual third pickup tube 11*a*), the circuit of FIGURE 1 is meant to illustrate conventional color television transmitter and receiver circuits, such as shown and described in Color Television—Theory, Equipment, Operation, 2nd edition, 1959, published by Radio Corporation of America. Thus, for present purposes, FIG. 1 is of interest principally in connection with the two pickup tubes 12 and 13 because the information derived from these is sufficient, with the novel receiver tube disclosed herein, to present in color, the scene being televised.

The scene viewed by camera 11 is optically resolved into a plurality of like image beams, such as the beams 14 and 15, by a lens, prism and mirror array 16, and, thereafter, each of these beams is passed through a different one of the color filters, 17 and 18 respectively, before being permitted to impinge upon the sensitive surfaces of its associated pickup tube. One of these filters, 17, passes essentially one color component in the scene, such as its red content falling within the reddish (relatively long) wavelengths of light in the Newtonian spectrum, while the other, 18, passes a specifically different color component corresponding, for example, to the greenish (relatively short) wavelengths in the scene. As a result of these actions, the scene viewed by camera 11 is optically resolved into two color separation images, one focused on the sensitive surface of pickup tube 12, and one focused on the sensitive surface of pickup tube 13. The color separation image associated with tube 12 constitutes the red record of the scene; and since light from the scene producing the red record has wavelengths longer than the wavelengths of light producing the green record, the red record is termed, alternatively, the long record, or the relatively long wavelength color separation record; and the green record is termed, alternatively, the short record, or the relatively short wavelength color separation record.

The color separation record associated with each tube is scanned in the conventional manner, preferably by common deflection circuits. The output of camera 11 thus includes a plurality of video signals, one of which characterizes relatively long wavelength color separation record of the scene and constitutes what is termed the red or long video signal, or the relatively long wavelength color separation signal; and another of which characterizes relatively short wavelength color separation record and constitutes what is termed the green or short video signal, or the relatively short wavelength color separation signal. If each of these video signals were applied to different conventional black and white television receivers, the red color separation signal would reproduce, in achromatic light, the red or long record of the scene; and the green color separation signal would reproduce, also in achromatic light, the green or short record of the scene. In both cases, the relative darkness of an element in the picture would be a measure of the relative amount of red or green light emanating from that element in the scene. Each color separation video signal, therefore, characterizes the luminance, or brightness, of the respective color separation image being scanned.

As is conventional, transmitter circuits 10 encode the color separation video signals for transmission to receiver 8, where such signals are decoded to recreate the independent color separation signals substantially as they were at the transmitter. Thus, the VHF signals from antenna 19 are applied to receiver circuitry 20, and thence are resolved into their five principal components by the other block-diagrammed circuits, all of which may be of the type currently well known in commercial three-color television receivers. The audio components are translated in the detector and amplifier circuitry 21, for excitation of the speaker 22. Luminance information conveyed by the video component is applied to both of the dual guns 23 and 24 of a unique form of picture tube 25, via coupling 26 from suitable amplifier 27 incorporating any needed delay, for the purpose of modulating the intensities of both of their emitted electron beams in accordance with the composite detections by all of the camera pickup tubes. Absenting any further impression or modulation of color or chrominance information upon the electron beams, they are prepared to trace a black-and-white reproduction of the transmitted scene and can actually do so upon the screen array provided for tube 25, but for color reproduction each of the beams is separately modulated by the application of a different color-control signal to its grid. These chrominance control signals, corresponding to the relatively long color separation signal and the relatively short color separation signal, are shown to be applied to the respective grids by way of couplings 28 and 29 from the red (R) and green (G) output channels only of a matrix demodulator network 30 such as that designed for use with known prior types of three-color tubes, although the blue (B) output channel either remains unused (as shown) or is instead combined with that of the green channel for present purposes. The three-color receiver circuitry illustrated to emphasize the full compatibility of the present invention with common three-color transmissions, further includes the usual color burst separator, 31, for segregating the eight-cycle color burst signal appearing in the back porch of the horizontal sync pulse, under control of the gate pulse generator 32, a burst-synchronized signal source (reference sub-carrier oscillator) and phase shifter 33, and the chrominance filter and amplifier 34 which passes the chrominance information to the color-signal demodulator 30. The synchronized deflection and high voltage circuitry 35 supplies excitation for the field and line sweep windings 36 and 37, and, from its high voltage source, applies high accelerating potential to the second anode 38 of picture tube 25. As is well understood in the art, the demodulator outputs in the red (R), green (G) and blue (B) channels respectively represent the red, green and blue signal information, absenting associated luminance or brightness characteristics, in a scene televised through a standard three-color camera having three corresponding pickup tubes and filters. For purposes of the present invention only the aforementioned pickup tubes 12 and 13 need be relied upon and, in alternative system designs which reflect this lesser need, the apparatus may be simplified.

The information thus expressed in the pair of modulated scanning electron beams is uniquely translated into visual displays of the televised scene, in full color, by way of their interplay with the screen array 39 disposed near the transparent face 40 of the evacuated picture tube 25. That screen array includes a relatively thin outer coating of phosphor 41, disposed within and nearer the face, and contoured like it and in conformity with the needed raster shape. Phosphor 41 is selected for its emissivity or fluorescence of essentially greenish (such as a green-blue) light when the electron beams impinging upon it have at least a certain minimum kinetic energy. Superposed directly upon the first coating is an inner, second coating 42, which comprises a phosphor which emits essentially reddish light not only when the impinging electron beams possess at least the aforesaid kinetic energy but also when they possess a higher kinetic energy which is sufficient to develop a material level of visible output from the outermore first coating after the electrons have first been passed through and retarded by the second coating. The desired higher kinetic energy is insured for these purposes by an appropriately high accelerating potential impressed upon the second anode (such as a coating sold under the trademark "Aquadag") 38. Both electron guns of the picture tube are aimed and controlled to project their electron beams toward the screen assembly so that they impinge in closely-spaced relationship, such as one wherein they possess a slight displacement in the direction of field (vertical) scanning. One of these beams, from the electron gun 24 incorporating grid control responsive to the red or long video signal, is aimed and vertically scanned to make its horizontal line traces directly along horizontal closely-spaced but physically separated parallel metallic strips of a retardation grid 43 which covers the entire raster area and is superposed upon the second (inner) phosphor coating 42. The long horizontal strips making up this grid are each of width comparable to the size of the focussed electron beam which scans each line of the raster, and the equal spacing between them is of at least such width also. Aluminum strips of a number about equal to the number of lines per frame of the raster, and about 20 thousandths of an inch wide exemplify one construction. As a consequence of this focusing arrangement, the scan of each line of the raster causes two displaced traces to take place that develop simultaneously in side-by-side relationship, a portion of the red color separation record in reddish light and the same portion of the green color separation record in achromatic light. One trace is due to the beam from green gun 23 after that beam passes between adjacent aluminum strips of grid 43 and impinges on and excites both phosphor layers, and the other trace is due to the beam from red gun 24 after that beam is intercepted by an aluminum strip and slowed down prior to impinging on the phosphor layers. Thickness of the grid strips is sufficient to retard the electrons accelerated by the second anode and to reduce their kinetic energy to a level at which the phosphor coating 42 is nevertheless stimulated to emit its reddish light, but from which level the phosphor coating 42 then further reduces the kinetic energy of the electrons to a level at which the phosphor of the outer coating 41 cannot be stimulated to produce any substantial green-blue light output. Whether or not any light is emitted by either phosphor coating at any instant as well as the extent of its luminance or brightness, is advantageously independent of such actions related to kinetic energy of the electrons and is instead dependent upon electron beam currents which are separately regulated by the electron gun grids. The beam from gun 24 is therefore in control of reddish or long-record emissions only. Gun 23, on the other hand, is simultaneously aimed and scanned to make its horizontal line traces solely along the spaces intermediate the grid strips, and its electron beam, if flowing under gun grid control, must always impinge upon and excite both phosphor coatings simultaneously, without sufficient retardation to preclude emissions of light from both. Thin phosphor coatings such as the outer coating 41 are sufficiently transparent or translucent to permit the visible emissions from the inner coatings to reach the observer. On the completion of one frame of scanning, the beam from gun 24, being modulated by the red or long video signal, will have reproduced on face 40 of tube 24, closely spaced strips of the red color separation record in chromatic light that is reddish, substantially as such record appears on the sensitive surface of pickup tube 12. At the same time, the beam from gun 23, being modulated by the green or short video signal, will have reproduced on face 40 of tube 24, closely spaced strips of the green color separation record that are interlaced with the strips of the red color separation record. However, of critical importance is the fact that the strips of the green color separation record are in achromatic light, substantially as such record would appear on a conventional black and white television screen where the beam current is controlled by the green video signal. The beam from gun 23, passing between adjacent aluminum strips has sufficient energy to simultaneously excite the phosphors of both coatings 41 and 42. The chromatic light emitted from coating 42, which is reddish, combines with the chromatic light emitted from coating 41, which is blue-greenish and thus complementary to the light emitted from coating 42, to produce achromatic light, since, as is well known, the combination of light of a primary color (red) with light that is complementary (blue-green, cyan or minus red) produces achromatic light. All of the grid strips may be connected together, at their ends, for example, to permit unwanted charges to be removed by way of a connection 44.

The apparatus thus far described produces two essentially superimposed reproductions of a televised scene, the adjacent interlaced lines preferably being close enough to remain indistinguishable at normal viewing distances. One of these reproductions is primarily reddish, from the light of the inner phosphor coating, while the other is whitish, as a consequence of combined simultaneous superposed emissions from the inner reddish and outer green-blue phosphor coatings. To the observer, however, these reproductions in registration with one another do not appear as the expected pink but, instead, display the substantially natural colors of the televised scene. A theory which explains this phenomenon is predicated upon a recognition that the eye may sense color without specific reference to wavelengths of colors as allocated in the Newtonian spectrum. It appears that it is not merely absolute wavelength, but the random interplay of longer and shorter wavelengths over a total image, which may account for full color, and it thus occurs that there are numerous combinations of two or more wavelengths or bands of wavelengths selected from the visible spectrum which will develop such full color. An important phenomenon for present purposes is that relatively long and short records of the same scene when reproduced in terms of relatively long and short wavelengths of emitted light, which are not necessarily the same as the wavelengths of the original records, however, develop the required color. As has been explained in connection with the apparatus of FIGURE 1, for example, the red (long) and green (short) records presented to the camera pickup tubes are reproduced in terms of reddish (long) and whitish (short) light to produce the needed colors. The original color records of a scene may be derived with reference to many possible paired combinations of wavelengths, of which the aforementioned red and green filtering provides but one example. Similarly the reproductions may be in terms of a variety of paired combinations of wavelengths, such as a combination of light having wavelength from 550–590 millimicrons (long) and light having wavelength up to 580 millimicrons (short) although separated from the long wavelength by 10–25 millimicrons, or light having wavelength of 550 or more millimicrons (long) and light having wavelength from 400–450 millimicrons (short), and others.

Figure 2:
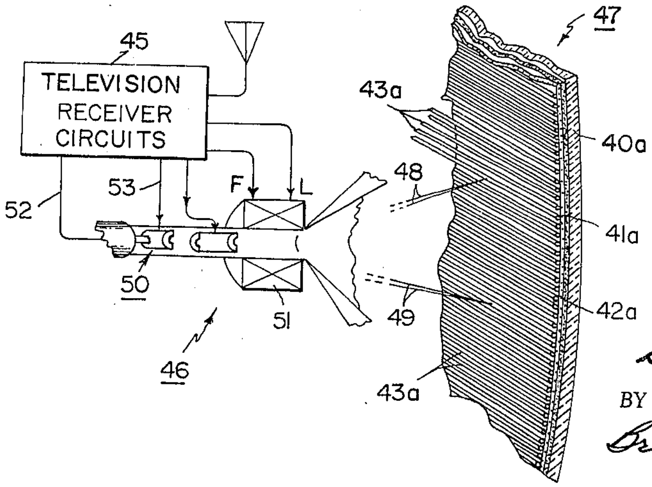
FIG. 2 illustrates color television receiver apparatus including a cut-away portion of the neck assembly of a picture tube together with a relatively enlarged fragment of its faceplate assembly.

The receiver apparatus illustrated in FIG. 2 includes receiver circuits 45 which actuate another form of kinescope, or picture tube 46, embodying the present teachings. Faceplate 47, shown in fragmentary form is of the same construction as the faceplate arrangement of picture tube 25 in FIGURE 1, and for convenience in description and understanding the same reference characters are applied to the parts functionally alike, with the added distinguishing subscript *a*. Electron beam impingements upon one of the retardation grid strips 43*a*, and between these strips, are characterized by linework 48 and 49, respectively. While such beam impingements are developed from separate electron beams in the tube 25, they are produced by but a single beam from one gun structure 50 in the case of picture tube 46. Accordingly, the use of but a single electron beam requires that the beam be appropriately focused in its sweep to touch upon only the strip, or only the adjacent space between a strip, or upon both the strip and adjacent space, in each discrete area of the raster each time a scene is fully traced at the face of the tube. The raster may be traced according to line-by-line, spot-by-spot, or frame-by-frame scanning techniques which are well known. In those instances where color modulation is on a spot-by-spot basis, the retardation grid strips 43*a* are advantageously disposed transversely to the line-sweeping direction of electron beam scanning. In those instances where color modulation is on a frame-by-frame basis, the electron beam may be focused in its sweep to touch only the adjacent space between strips during odd-line scanning and only the strips during even-line interlaced scanning, or vice versa. Where the scan is such that the beam first sweeps between the strips, and then on the strips, the electrons will simultaneously excite the phosphors in coatings 41*a* and 42*a* during sweeps between the strips, but will excite only the phosphors of coating 42*a* during sweeps on the strips. As is explained hereinafter, the simultaneous excitation of the coatings 41*a* and 42*a* reproduces on the face of tube 60 in achromatic light, a portion of the green color separation record; while the excitation of only coating 42*a* reproduces on the face of tube 60, in reddish light, a portion of the red color separation record that is in registration with the portion of the green color separation record reprodued in achromatic light. Receiver circuitry used for such reproductions applies to proper horizontal (line) and vertical (field) deflection signals to the deflection windings 51, luminance signals to the electron gun via coupling 52, and color signals to the electron gun grid by way of coupling 53. As the inherent mode of operation of this apparatus implies, it is thus not essential to production of the full-color images that the pairs of long and short wavelengths of light be developed simultaneously in any area of the raster, and the usual rapid scanning rates are sufficient to present the color information which the eye requires to perceive full color in accordance with the applicable theory.

Phosphor emissivity characteristics which are typical of those exploited in this invention are presented graphically in FIG. 3, wherein emissivity (visible emission due to fluorescence) increases along the ordinate while electron velocity (hence, kinetic energy) of the electrons in a beam directed at superposed phosphors, and the related accelerating potential, in a cathode ray tube appear along the abscissa. Curve 54, characterizing a long-record phosphor such as the reddish phosphors 42 and 42*a* disposed nearer the electron guns, is shown to reach a peak and substantially optimum emissivity at 55 when the impinging electrons have a velocity such as that developed by an accelerating potential $E_1$ in a given tube, while under the same conditions an underlying short-record phosphor such as the green-blue phosphors 41 and 41*a* blocked by the other phosphor, can develop no relatively substantial light emission, as is evident from the locus of point 56 on curve 57. In the latter connection, it will be understood that the phosphor characterized by curve 54 is disposed between the electron gun and coating of the phosphor or curve 57, thereby retarding the velocity of electrons which reach the latter phosphor. Electrons directed upon the superposed phosphors at a higher velocity, such as that developed by the higher potential $E_2$, will occasion substantially optimum emission from the underlying short-record phosphor even after the retardation caused by the intervening long-record phosphor, as designated at point 58, while the long-record phosphor then, very advantageously for purposes of this invention, nevertheless continues to develop an important visible emission, as designated at point 59 on the long-record curve 54. The important retarding effect of the retardation grid strips, where they also intervene, causes the kinetic energy of the impinging electron beams to be reduced to the level appearing at point 55, which is sufficient to stimulate visible emission from the immediately underlying long-record phosphor while being insufficient to stimulate visible emission from the short-record phosphor after travel through the long-record phosphor. The receiver picture tubes in FIGS. 1 and 2 accomplish the requisite changes in electron velocities and differences in phosphor emissions by way of the retardations by the grid strips, the accelerating potential (second anode potential) in each instance remaining substantially constant at a level $E_2$, throughout the operation. However, as appears later herein, the retardation may also be effected by way of modulations of the accelerating potentials.

Picture tube 60 which is excited by television receiver circuits 61 in FIG. 4 possesses a faceplate construction which obviates the need for retardation grids or equivalent screens. There, the first, and outer, continuous phosphor coating 62 covering the raster area of transparent tube face 63 comprises a phosphor which emits but one of the two desired wavelengths or bands of wavelengths of light, such as reddish light, while the other wavelength or bands of wavelengths of emitted light, preferably blue-green light, emanates from spaced regularly distributed quantities of phosphor 64. In one arrangement, the inner phosphor 64 is applied as horizontal stripes, corresponding in number and size and spacing to the retardation grip strips described earlier herein, although alternatively these quantities may be in dot or spot form. Techniques which enable precise deposition of such quantities of phosphor upon the underlying coating are well developed in the art. Depending upon its instantaneous deflections, electron gun 65 directs its electron beam upon the faceplate such that it either impinges upon a stripe or passes through the space between stripes at any instant. The stripes 64 may also be disposed transversely to the line-scanning direction. When the outer coating 62 is selected to produce reddish emissions, the electron gun in its scanning of the spaces on the faceplate is grid-controlled in accordance with the long-record or red color signals applied over coupling 67. At such times as the emissions are to be in accordance with the short record, however, the beam is aimed to scan the stripes and is then grid-controlled in accordance with the aforementioned short-record or green color signals delivered to it by way of the coupling 67. As in the case of picture tube 25 in FIGURE 1, the luminance or brightness control signals are also applied to the gun, via coupling 69, and the usual field and line deflection signals are impressed upon the deflection winding assembly 70. Linework 71 and 72 characterize the faceplate impingements of the electron beam upon and between the stripes, respectively. The beam as designated by numeral 71 strikes both phosphors simultaneously, and is of kinetic energy sufficient to stimulate the inner phosphor stripes to emit their characteristic wavelengths and, preferably it simultaneously stimulates emission from the underlying phosphor coating whereby a reproduction of the short-record of the scene as televised through a short-record (ex., green) filter is traced at the picture tube face in achromatic light. The beam as designated by numeral 72 may strike only the phosphor of the outer coating 62 and thereby produces a reddish reproduction of the long-record scene as televised through a long-record (ex., red) filter. The carefully registered interlaced reproductions thus stimulate perception of the televised scene in full color.

In FIG. 5, the kinescope 73 embodies a faceplate construction wherein the interior of the transparent tube face 74 is covered across the intended raster area by a first phosphor coating 75 separated from a second superposed phosphor coating 76 by a thin filter screen 77. Coating 75 may possess either the short-record or long-record emission characteristics, while coating 76 includes the wavelengths of the other emission characteristic in its visible output. However, outermore coating 75, which is shielded from the electron gun assembly by coating 76 and screen 77, emits substantial visible light only when the electrons projected upon the target assembly have a higher kinetic energy than that required to stimulate substantial visible emission only from the exposed innermore phosphor coating 76. Filter screen 77, which may comprise a deposited metallic layer, such as a gold layer, is thin enough however to transmit light and to achieve a light color filtering. In the case of a thin gold layer, for example, the transmission is of bluish-green light, suitable for purposes of filtering the light output of inner coating 76 into the form of a short-record (greenish) reproduction at the face of the tube. Other materials are known to offer comparable advantageous filtering actions, of course. While the phosphor 76 may be selected for its emission of light of wavelength favored by the filter screen, this is not essential, and whitish light emission or the like containing wavelengths corresponding to greenish (or other color, depending upon the nature of the filter screen filtering) light is satisfactory. Where the short-record reproduction through filter screen 77 is of greenish light, then the long-record reproduction by outer phosphor coating 75 is preferably reddish, such that the two superimposed emissions will together yield a desired whitish short-record reproduction of the televised scene. The required differences in kinetic energy of the impinging electrons, for color control purposes, may be occasioned in the case of a single-gun tube by appropriately modulating the accelerating potential on the usual second anode, or a comparable anode. Advantageously, for purposes of alternative black-and-white reception and reproduction alone, the accelerating potential may then simply be selectively maintained at the higher value, such that the luminance signals applied to the gun will suffice to create the desired black-and-white image. In the case of a dual-gun tube, the two electron guns may be set permanently at different potential levels relative to the second anode, or an equivalent anode, and in this connection the positions of the two guns may be staggered axially along the neck of the picture tube to promote desirable uniform field distributions within the picture tube. Modulation of the accelerating potential, or the establishment of different gun-to-accelerating anode potentials, also permits the tube faceplate to be constructed simply with two superposed phosphors of the required types each developing emission having a different one of the two needed long-record and short-record wavelengths, without the need for a retardation screen.

The latter arrangement of phosphors is characterized by dashed linework 78 designating the faceplate arrangement for picture tube 79 in the television receiver shown in part in FIG. 6. Accelerating potential of second anode 80 is there modulated between two levels by way of an electronic switch 81 which delivers either a relatively higher or lower potential to the anode 80 from the high voltage source 82 exhibiting the appropriate higher and lower potentials at its output terminals marked H and L respectively. Luminance circuitry 83 applies video information to the electron gun 84 while the matrix demodulator 85, or equivalent substitute circuitry couples color signals into the gun at 86. A color control unit 87 is shown as applying the needed triggering information to the electronic switch 81. Conveniently, the switch 81 may be set or biased to apply the higher voltage to anode 80 except when triggered to the opposite switching condition by the control unit, whereby only whitish light is emitted during scanning unless the appearance of a red signal output at terminal R of color circuitry 85 immediately excites the control unit 87 to trigger the electronic switch 81 for its application of the lower potential to anode 80. Full color reproduction is offered at the face of tube 79, in accordance with the theory and modes of operation referred to earlier herein. Electromagnetic radiation is suppressed by shielding 88.

The target phosphors utilized in practice of this invention obviously may be of the same types and compositions as those which have been exploited in conventional three-color picture tubes, or the like. Among these are the red-emitting phosphor $Zn_3(PO_4)_2$:Mn, the blue-emitting phosphor ZnS:Ag:MgO, and the green-emitting phosphor willemite ($Zn_2SiO_4$:Mn), and others known in the art. Also, one of the phosphors may be "positioned" by addition of impurities in a known manner to shift its emissivity vs. kinetic energy (electron velocity) characteristic upwardly in the manner of curve 57 in FIG. 3.

Those skilled in the art can now appreciate that there are four main embodiments to the present invention, namely the embodiments of FIG. 1, FIG. 2, FIG. 4 and FIG. 5. Each of these embodiments discloses a kinescope having a target screen with a covering thereon, electron gun means for producing electrons focused to impinge upon the covering, and deflection means for causing the electrons to scan the covering to define a raster. Each of the embodiments also discloses a covering comprising a first continuous layer that includes a first phosphor which emits red light when excited by electrons, and a second phosphor which emits minus-red light when excited by electrons. The second phosphor is distributed over the raster in proximity to the first phosphor, which is to say that the second phosphor is adjacent to the first phosphor but not in the same plane. For example, in the embodiment of FIG. 4, outer coating 62 constitutes the first continuous layer, and stripes 64 superposed on coating 62 constitute a second phosphor which emits minus-red light.

Broadly speaking, each of the embodiment discloses receiver means for controlling the scan of electrons on the covering so that only the first phosphor is excited in accordance with the red video signal for causing the red color-separation image to be reproduced on the raster in red light, and each of the first and second phosphors are excited in accordance with the green video signal to emit substantially the same amount of light for causing the green color-separation image to be reproduced on the raster in equal amounts of red and minus-red light. For example, the receiver means of the embodiment of FIGURE 1 includes the retardation grid 43, and anode 38. The latter is held at a constant accelerating potential corresponding to the energy level of electrons sufficient to cause both the red and the minus-red phosphors to be excited simultaneously into emission of equal amounts of red and minus-red light that combine to produce achromatic light. However, considering the embodiment of FIG. 5, the receiver means does not include a retardation grid. Instead, it includes an anode and the means for switching the accelerating potential between two levels. The first level corresponds to the energy level of electrons sufficient to simultaneously excite superposed layers 75 and 76 into emission of achromatic light, and the second level corresponds to the energy level of electrons sufficient to excite only the layer emitting red light. In addition, the receiver means includes the means by which the single electron beam is caused to be intensity modulated by the green video signal when achromatic light is emitted and by the red video signal when only red light is emitted.

Those skilled in the art will also note that in each of the embodiments of FIGS. 1, 2 and 5, the second phosphor is included in a second continuous layer that covers the raster in superposed relationship to the first layer and is more remote from the electron gun means than the first layer. The embodiment of FIG. 5, of course, permits the layer to have either order. Likewise, each of the embodiments of FIGS. 1, 2 and 5 is such that the so-called receiver means associated therewith causes the phosphors of both layers to be simultaneously excited.

While specific practices have been described, and while particular embodiments have been illustrated and referred to in the descriptions, it should be understood that various changes, modifications and substitutions may be effected without departure from these teachings, and it is aimed in the appended claims to embrace all such variations as fall within the true spirit and scope of this invention.

What is claimed is:

1. A television receiver comprising:

receiver means for producing electrical signals including first and second electrical signal components representing relatively long and relatively short dominant wavelength contents of the scanned picture elements in the scene being televised;

a kinescope having a target screen with a covering thereon comprising at least two cathodoluminescent phosphors, one of which emits only relatively long wavelength light when excited by electrons and another of which emits only relatively short wavelength light when excited by electrons and electron gun means for producing electrons focused to impinge on said covering; and means including said electron gun means responsive to said first signal component to produce relatively low energy level electrons capable of exciting only said one cathodoluminescent phosphor to produce relatively long wavelength light and responsive to said second signal component to produce relatively high energy level electrons capable of exciting both of said cathodoluminescent phosphors simultaneously to produce substantially achromatic light.

2. A television receiver according to claim 1, in which the cathodoluminescent phosphors are arranged as layers over the raster of the kinescope and wherein the phosphor layer which emits short wavelength light is more remote from the electron gun than the phosphor layer which emits long wavelength light whereby the impingement on the covering of low energy electrons from the said electron gun excites the nearer layer alone to produce long wavelength light and the impingement on the covering of high energy electrons excites both layers simultaneously to produce substantially achromatic light.

3. A television receiver according to claim 1 in which the receiver means includes means to effect density modulation of electrons having said relatively low energy level in accordance with said first signal component whereby there is produced on said covering a long wavelength image whose intensity varies from picture element to picture element in accordance with the relatively long dominant wavelength content of the corresponding picture elements of the scene, and to effect density modulation of electrons having said relatively high energy level in accordance with said second signal component whereby there is produced on said covering a substantially achromatic image whose intensity varies from picture element to picture element in accordance with the variation in the relatively short dominant wavelength content of the corresponding picture elements of the scene.

4. A color television receiver comprising:

receiver means for producing electrical signals including first and second electrical signal components representing, respectively, relatively long and relatively short dominant wavelength contents of the scanned picture elements in the scene being televised;

a kinescope having a target screen with a covering thereon comprising at least two cathodoluminescent phosphors, one of which emits primarily relatively long wavelength light when excited by electrons and another of which emits primarily relatively short wavelength light when excited by electrons, and electron gun means for producing electrons focused to impinge on said covering; and means including said electron gun means responsive to said first signal component to produce relatively low energy electrons capable of exciting only said one cathodoluminescent phosphor to produce a first image component of relatively long wavelength light and responsive to said second signal component to produce relatively high energy level electrons capable of exciting both of said cathodoluminescent phosphors simultaneously to produce a second image component of whitish light.

5. A color television receiver comprising:

receiver means for producing electrical signals including first and second electrical signal components representing, respectively, relatively long and relatively short dominant wavelength contents of the scanned picture elements in the scene being televised;

a kinescope having a target screen with a covering thereon comprising at least two cathodoluminescent phosphors, one of which emits primarily relatively long wavelength light when excited by electrons of relatively high or low energy levels and another of which emits primarily relatively short wavelength light when excited by electrons of relatively high energy levels, and electron gun means for producing electrons focused to impinge on said covering; and means including said electron gun means responsive to said first signal component to produce a first image component of relatively long wavelength light by exciting said covering with electrons of relatively low energy levels and responsive to said second signal component to produce a second image component of substantially achromatic light by exciting said covering with electrons of relatively high energy levels.

6. A television receiver for producing displays from electrical signals including first and second electrical signal components representing, respectively, relatively long and relatively short dominant wavelength contents of the scanned picture elements in the scene being televised, comprising:

a kinescope having a target screen with a covering thereon comprising at least two cathodoluminescent phosphors, one of which emits only relatively long wavelength light when excited by electrons and another of which emits relatively short wavelength light when excited by electrons, and electron gun means for producing electrons focused to impinge on the covering; and receiver means for controlling the energy levels of primary electrons impinging on the covering from the electron gun means so that only said one cathodoluminescent phosphor is excited by low energy level electrons in accordance with the first signal component for causing said covering to emit relatively long wavelength light and both of said cathodoluminescent phosphors are excited simultaneously by higher energy level electrons in accordance with the second signal component for causing said covering to emit substantially achromatic light.

7. A television receiver for producing polychromatic displays from electrical signals including first and second electrical signal components representing, respectively, relatively long and relatively short dominant wavelength contents of the scanned picture elements in the scene being televised, comprising:

a kinescope having a target screen with a covering thereon comprising at least two cathodoluminescent phosphors, one of which emits primarily relatively long wavelength light when excited by electrons and another of which emits primarily relatively short wavelength light when excited by electrons, and electron gun means for producing electrons focused to impinge on the covering; and receiver means for controlling the energy levels of primary electrons impinging on the covering from the electron gun means so that only said one phosphor is excited by low energy level electrons in accordance with the first signal component for forming a first image component of relatively long wavelength light and both of said phosphors are excited simultaneously by higher energy level electrons in accordance with the second signal component for forming a second image component in whitish light.

8. A television receiver comprising:

receiver means for producing electrical signals including first and second electrical signal components representing relatively long and relatively short dominant wavelength contents of the scanned picture elements in the scene being televised; and a kinescope having a target screen with a covering thereon comprising at least two cathodoluminescent phosphors, one of which emits only relatively long wavelength light when excited by electrons and another of which emits only relatively short wavelength light when excited by electrons, and electron gun means for producing electrons focused to impinge on said covering and connected to respond to said first signal components to produce relatively low energy level electrons capable of exciting only said one cathodoluminescent phosphor to produce relatively long wavelength light and to respond to said second signal component to produce relatively high energy level electrons capable of exciting both of said cathodoluminescent phosphors simultaneously to produce substantially achromatic light.

9. A color television receiver comprising:

receiver means for producing electrical signals including first and second electrical signal components representing relatively long and relatively short dominant wavelength contents of the scanned picture elements in the scene being televised; and a kinescope having a target screen with a covering thereon comprising at least two cathodoluminescent phosphors, one of which emits primarily relatively long wavelength light when excited by electrons and another of which emits only primarily relatively short wavelength light when excited by electrons, and electron gun means for producing electrons focused to impinge on said covering and connected to respond to said first signal components to produce relatively low energy level electrons capable of exciting only said one phosphor to produce a first image component of relatively long wavelength light and to respond to said second signal component to produce relatively high energy level electrons capable of exciting both of said phosphors simultaneously to produce a second image component of whitish light.

10. A television receiver comprising:

receiver means for producing electrical signals including first and second electrical signal components representing relatively long and relatively short dominant wavelength contents of the scanned picture elements in the scene being televised;

a kinescope having a target screen with a cathodoluminescent covering thereon and electron gun means for producing electrons focused to impinge on said covering;

means including said electron gun means responsive to said first signal component to produce relatively low energy level electrons and responsive to said second signal component to produce relatively high energy level electrons; and said cathodoluminescent covering comprising at least two phosphors, one of which emits only relatively long wavelength light when excited by primary electrons of said low or high energy levels and another of which emits relatively short wavelengths of light when excited only by primary electrons of said high energy levels whereby both of said phosphors are excited simultaneously by said high energy level electrons in accordance with the second signal component for causing said covering to emit substantially achromatic light.

11. A television receiver comprising:

receiver means for producing electrical signals including first and second electrical signal components representing, respectively, relatively long and relatively short dominant wavelength contents of the scanned picture elements in the scene being televised;

a kinescope having a target screen with a cathodoluminescent covering thereon and electron gun means for producing electrons focused to impinge on said covering; and means including said electron gun means responsive to said first signal component to produce relatively low energy level electrons in the production on said screen of a first image component and responsive to said second signal component to produce relatively high energy level electrons in the production on said screen of a second image component;

said cathodoluminescent covering comprising at least two phosphors, one of which emits primarily relatively long wavelength light when excited by primary electrons of said low or high energy levels and another of which emits primarily relatively short wavelengths of light when excited only by primary electrons of said high energy levels whereby both of said phosphors are excited simultaneously by said high energy level electrons in accordance with the second signal component to produce said second image component in whitish light.

References Cited by the Examiner

UNITED STATES PATENTS

| | | | |
|---|---|---|---|
| 2,297,444 | 9/1942 | Von Bronk | 178—5.4 |
| 2,431,088 | 11/1947 | Szegho | 178—5.2 |

(Other references on following page)

UNITED STATES PATENTS

| | | | |
|---|---|---|---|
| 2,446,248 | 8/1948 | Schrader | 313—92 |
| 2,476,619 | 7/1949 | Nicoll | 178—5.2 X |
| 2,529,485 | 11/1950 | Chew | 178—5.2 |
| 2,532,511 | 12/1950 | Okoliczsanyi | 178—5.2 |
| 2,827,593 | 3/1958 | Koller | 315—21 |
| 3,003,391 | 10/1961 | Land | 88—16.4 |

FOREIGN PATENTS

| | | |
|---|---|---|
| 1,159,899 | 7/1958 | France. |
| 562,168 | 6/1944 | Great Britain. |

OTHER REFERENCES

Bess: "A Red-White Kinescope for Color Television": RCA 2 shts.; August 18, 1958.

DAVID G. REDINBAUGH, *Primary Examiner.*

ROBERT SEGAL, *Examiner.*